May 10, 1955 P. H. TAYLOR 2,708,109
FLUID SPRING
Filed Aug. 23, 1950 2 Sheets-Sheet 1

INVENTOR.
Paul H. Taylor
BY Edwin B. Gary
Attorney

May 10, 1955

P. H. TAYLOR 2,708,109

FLUID SPRING

Filed Aug. 23, 1950

INVENTOR.
BY Paul H. Taylor
Edwin B. Gary
Attorney.

United States Patent Office 2,708,109
Patented May 10, 1955

2,708,109

FLUID SPRING

Paul H. Taylor, North Tonawanda, N. Y., assignor to Wales-Strippit Corporation, North Tonawanda, N. Y., a corporation of New York Application August 23, 1950, Serial No. 180,966

10 Claims. (Cl. 267—1)

This invention relates generally to fluid springs.

Although the spring which embodies the features of the invention has many and varied uses, it is characterized by features which adapt it particularly, but not necessarily, for applications wherein the fluid medium employed is compressible either to provide a desired resilient or cushioning action or for storing energy which may be released to perform work.

The use of liquids such as oil, water, alcohol etc. as the compressible fluid in springs of the character referred to has been known for some time. Springs employing such liquids have the advantage that they are compact in design and are capable of carrying loads and storing energy far beyond the capacity of conventional metal springs of comparable size. Recently so-called "oil springs" have been employed in connection with the landing gear of aircraft, particularly of the heavier types. In such a spring, the fluid, preferably mineral oil, is compressed in a closed chamber by a sealed piston in response to forces acting upon the landing gear, the degree of compression of the oil varying in accordance with load represented by such forces. For example, under the action of the piston, the oil may be compressed as much as 13% by volume at a pressure of around 50,000 p. s. i. on the oil. Thus, "oil springs" may be utilized to support the aircraft on its landing gear and by the conjoint use of dash pots a suitable snubbing action may be provided for absorbing the resilient bounce of the aircraft. Owing to the extreme pressures to which such a spring may be subjected, however, the sealing of the fluid in the closed chamber has, in the past, been attained only with considerable difficulty, and then not satisfactorily. Rubber and other materials, when utilized as the sealing means, fail under the extreme pressures involved and the life of the spring is extremely short. When adequate sealing is obtained at low pressures, the seal fails under higher pressures; and when the seal is designed for such high pressures, unless the oil is maintained under some kind of pre-load, objectionable leakage occurs.

One seal which has been developed for "oil springs" for aircraft purposes is known as the "unsupported gland" type. In this type of spring a piston which is subjected to the pressure of the oil acts on, and compresses, a rubber gland. Since portions of the rubber gland are removed, the area of the piston to which the oil pressure is applied is greater than the area of the gland. Hence, the resultant greater pressure acting on the gland seals the side walls. This particular seal is suitable for larger sizes of springs but is unsatisfactory for smaller sizes. Moreover, the entire strut or landing gear leg must be held under some initial preload in order to prevent leakage of the gland in the no-load condition.

The primary object of the present invention, therefore, is to avoid the above objections and in so doing overcome the existing limitations with respect to the size of such springs and eliminate the necessity for pre-loading the springs in order to effect proper sealing.

A related object is to provide for sealing the closed fluid chamber in such a manner that a standard commercial seal such as is employed at low pressures may be utilized satisfactorily for the high pressures involved.

Another important object of the invention is to provide a fluid spring of a size suitable for carrying loads, small as well as large, such as are normally encountered in spring applications in industry.

Another object is to provide a fluid spring which is compact and in which the parts utilized are simple in design, may be assembled with facility and are inexpensive to manufacture.

Still another object of the invention is to provide a fluid spring having a self-energizing seal.

A related object is to provide a fluid spring which may be designed, if desired, to provide a pre-load of any given requirement.

Still another object of the invention is to provide a fluid spring which requires no pre-load for sealing.

A further object is to provide a spring having separate low and high pressure seals, the low pressure seal serving at low pressures and the high pressure seal coming into play when high pressures are developed.

These and other objects will be apparent from the accompanying description and the drawings, wherein.

Figure 1:
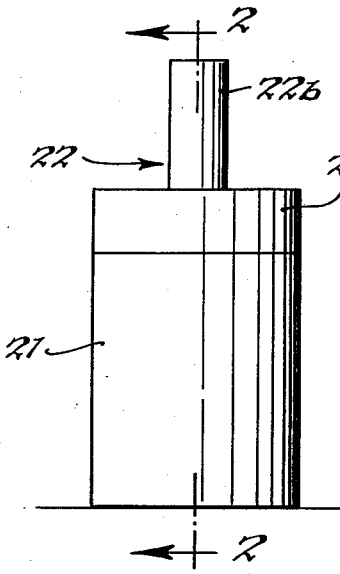
Figure 1 is an elevational view of a fluid spring embodying the features of the invention.
Figure 2:
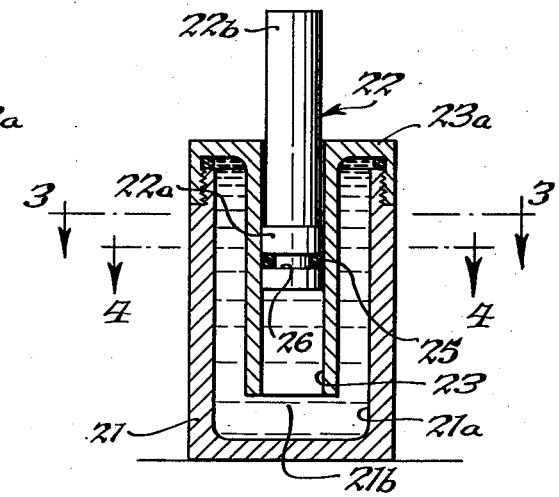
Figure 2 is a sectional view, taken along line 2—2 of Figure 1, illustrating the parts of the spring in operative relationship.
Figure 3:
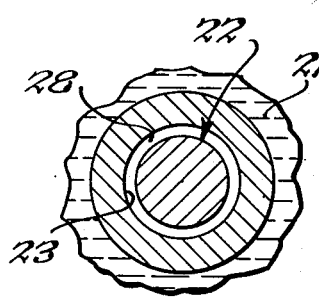
Figure 3 is an enlarged transverse section taken along line 3—3 of Figure 2 and showing the clearance between the piston shaft and cylinder under no-load conditions.
Figure 4:
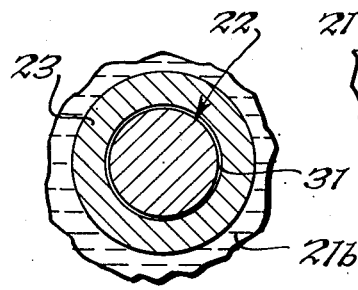
Figure 4 is an enlarged transverse sectional view taken along line 4—4 of Figure 2 and illustrating the clearance between piston and cylinder under the same conditions.

The fluid spring, as illustrated in Figures 1 and 2, includes a housing 21, which may be cylindrical as shown or any other desired shape, and a piston 22 which is operable within a cylinder 23. The latter is open at its upper and lower ends, the cylinder being carried at its upper end by a cap-piece 23a and the lower open end being supported above the bottom of the chamber 21a which is provided by the housing and which accommodates the compressible fluid medium 21b, such as, for example, mineral oil, water, alcohol and the like. Piston 22 has a head portion 22a and a shaft portion 22b, the latter being of such a diameter that a good clearance 28 (Figure 3) will be maintained between it and the inner wall of the cylinder under all operating conditions. Preferably, the head of the piston has a working clearance 31 (Figure 4) between it and the wall of the cylinder and is formed with an annular groove 26 for accommodating a conventional sealing ring 25. The clearance 31 is the usual and normal clearance for operation with standard type rubber sealing rings for high pressure ranges not exceeding 10,000 to 15,000 p. s. i. when utilizing back-up rings and 3000 to 5000 p. s. i. for plain rubber rings without back-up rings.

In the relation of the parts of the spring, as illustrated in Figure 2, the compressible fluid medium fills the closed chamber provided by the housing 21, cap-piece 23a, cylinder 23 and piston 22. Hence, any downward movement of the piston in the cylinder 23 can occur only as the fluid medium is compressed.

Figure 6:
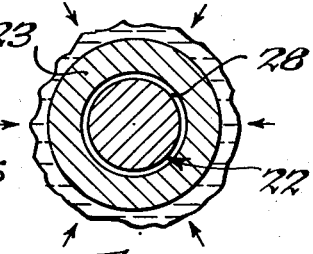
Figure 6 is an enlarged transverse section taken along line 6—6 of Figure 5 and illustrating the effect of the deflecting cylinder wall which tends to close the clearance shown in Figure 3.
Figure 7:
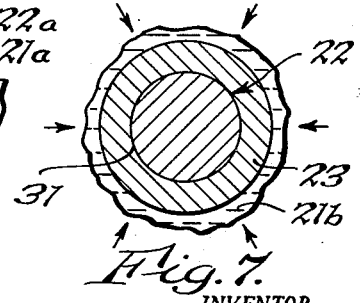
Figure 7 is a sectional view similar to Figure 4, being taken along line 7—7 of Figure 5 and illustrating the manner in which the cylinder wall is deflected under pressure to close the clearance shown in Figure 4 and provide a metal-to-metal seal between the piston and the cylinder.

In accordance with the invention, the thickness of the wall of the cylinder 23 is predetermined so that, as the piston 22 moves downwardly and compresses the body of fluid in the chamber 21a, fluid pressure acting against the cylinder wall is utilized to compress (deflect) the latter radially inwardly in all directions to, in effect, reduce the diameter of the cylinder 23 and in so doing reduce the clearance 28, as shown in Figure 6 and the clearance 31, as shown in Figure 7.

Figure 5:
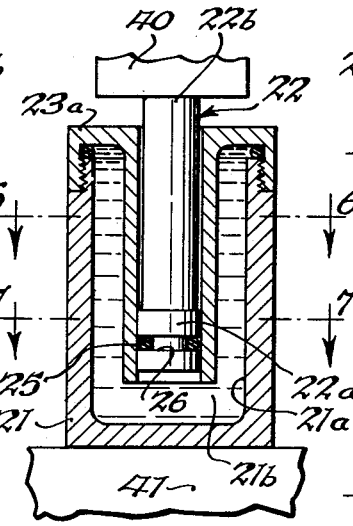
Figure 5 is a sectional view illustrating the spring under pressure, the cylinder wall being deflected to seal the normal clearance between it and the piston.

Referring in this connection to Figure 5, it will be noted that the piston 22 has been depressed by the action of some ram, or other device, 40 moving toward a bed 41, or other part to move the piston 22 downwardly within cylinder 23 and thereby exert pressure on the fluid 21b in the chamber 21a. This pressure which may be as high as 25,000 p. s. i. without requiring back-up rings, causes the downwardly extending cylinder wall 23 to deflect inwardly. This action is illustrated in Figure 6 which is similar to Figure 3 except that in Figure 6 the elements are shown under load, the clearance 28 between the piston shaft and the cylinder wall being reduced appreciably. This same action is also illustrated in Figure 7 which is similar to Figure 4 except that in Figure 7 the elements are shown under load, the clearance 31 between the head of the piston and the cylinder wall having been eliminated completely so that in effect the piston head is operating within a cylinder with no clearance and, therefore, no leakage. In effect, what has been accomplished is to utilize the sealing ring 25 as a servo means to generate sufficient pressure, within the limits of its ability to withstand the pressure, to cause the cylindrical wall 23 to deflect inwardly in proportion to the force on the fluid 21b which surrounds it. In practice, the wall 23 deflects in almost exact proportion to the force applied thereto, closing clearance 31 in proportion to the tendency of the ring 25 to extrude therethrough. In effect, this means that as the pressure increases the clearance 31 shrinks, always presenting a smaller clearance than that through which the sealing ring 25 will extrude until the clearance closes completely and metal-to-metal contact provides the seal.

While I have herein illustrated and described a simple piston and a simple sealing ring which are designed for a lower pressure range with my deflectable cylinder 23, say a maximum of 25,000 p. s. i., it will be obvious that by employing back-up rings in the usual manner and increasing the thickness of the wall 23 so that it does not deflect until higher pressures are reached, the maximum capacity of the unit may be increased so that it will be capable of withstanding 50,000 p. s. i., for example, whereas originally it had only been capable of withstanding 25,000 p. s. i. This, of course, is within the limits of the allowable deflection of the cylinder wall 23 for if the cylinder wall 23 is deflectable, it would be possible to exceed the elastic movement or allowable yield of the material, causing it to swedge permanently around the piston 22. While I have shown the piston 22 as having a reduced shaft portion, it will be obvious that by proper clearance or making it a straight member, distortion of the cylinder to the point where it will cause failure is prevented. Thus, the solid piston 22 can be used to support the deflectable wall 23 if it is so desired. However, in this case it may be desirable to make the piston 22 of one material and the cylinder wall 23 of another to lower friction and to prevent undue wearing as a result of the continued sliding action between the parts.

Figure 8:
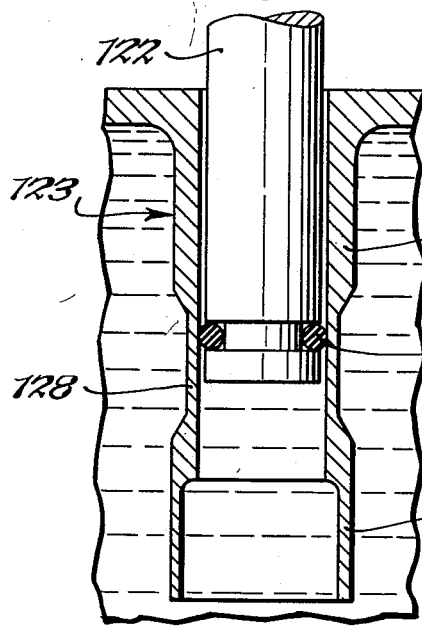
Figure 8 is a sectional view of another embodiment of the invention, the spring illustrated employing an intermediate deflectable cylinder wall section.
Figure 9:
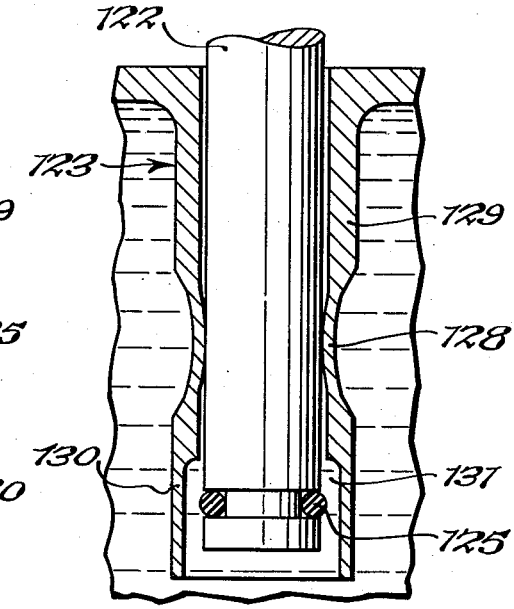
Figure 9 is a view similar to Figure 8 illustrating the action of the deflectable wall section under load conditions.

Referring to Figures 8 and 9, a modification of my spring is illustrated wherein a deflectable wall portion 128 of the cylinder 123 is located between upper and lower non-deflectable portions 129 and 130, respectively. The deflectable wall portion 128 is so located that the pressure produced by the downward movement of the piston 122 will not be sufficient to compress it substantially until after the sealing element 125 which is carried by the piston moves below it, as best shown in Figure 9. It will be noted that another internal recess 131 in cylinder 123 permits the fluid to by-pass the sealing ring 125 to relieve the pressure thereon after the cylinder wall portion 128 has been deflected to prevent fluid from passing between the deflected portion of the cylinder wall and the piston 122. This construction prevents the leakage of fluid as the higher pressure ranges are obtained and prevents the failure of the seal ring 125. Thus during the initial movement of the piston, and while the pressures involved are relatively low, the sealing ring 125 prevents the escape of fluid between the piston and the cylinder. However, as higher pressures are produced as a result of further movement of the piston the deflectable wall portion 128 is compressed to contact the piston above the sealing ring and establish a high pressure seal, the sealing ring 125 having, in the meantime, passed into the clearance 131 so that all pressures acting on it are equalized.

Figure 10:
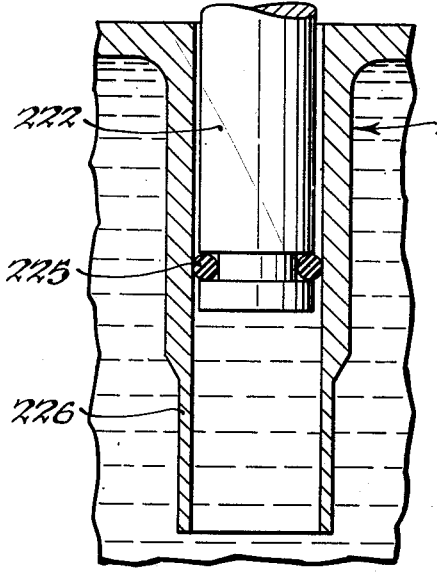
Figure 10 is a sectional view of still another variation of the invention, the deflectable wall section in this instance being located at the free end of the cylinder wall, or in the high pressure range only.
Figure 11:
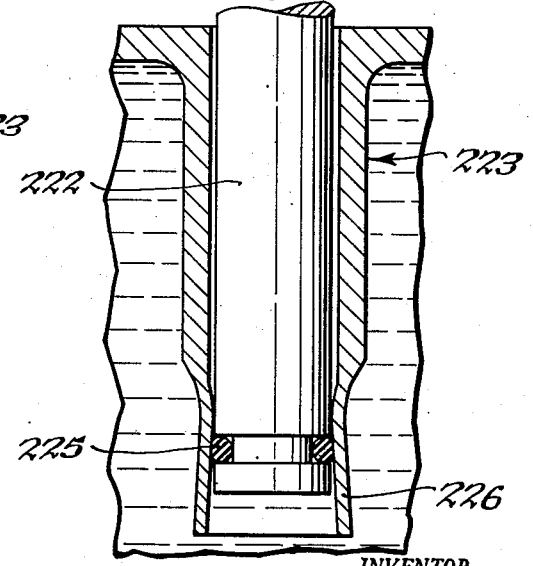
Figure 11 is a view similar to Figure 10 showing the deflectable cylinder wall section under load conditions.

In Figures 10 and 11 another modification of the device is illustrated. In this embodiment of the invention, portion 226 of the cylinder 223 is limited to that portion of the stroke during which the seal 225 would be normally subjected to pressures greater than it can handle. The action here is similar to that of Figure 1, but since the piston 222 is only subjected to metallic interference for a short portion of its stroke, the friction forces will not be critical, and hence a straight walled piston may be utilized which permits a much weaker deflectable wall portion 226 since it will always be supported against permanent set by the piston, as clearly illustrated in Figure 11.

Having thus described various embodiments of my invention, reference may be made to the claims appended hereto, which are intended to cover these and other embodiments of my device.

I claim as my invention:

1. A device of the character described comprising a chamber filled with a compressible liquid, a cylinder which extends into said housing and which communicates therewith and which has a deflectable wall portion, a piston which is movable in said cylinder to compress said liquid on its inward stroke and which has an initial working clearance in said cylinder, and sealing means carried by said piston which is operable to close said clearance during the initial inward movement of said piston, said deflectable wall portion being compressed by the pressure of said liquid when such pressure attains a predetermined value to close said clearance in an area separate from the area of contact of the sealing means with said cylinder, thereby providing a seal independently of that provided by said sealing means.

2. A device of the character described comprising a chamber filled with a compressible liquid, a cylinder which extends into said housing and which has a deflectable wall portion, and a piston which is movable in said cylinder to compress said liquid on its inward stroke and which has an initial working clearance in said cylinder, resilient sealing means carried by said piston which is operable to close said clearance during the initial inward movement of said piston, said deflectable wall portion being compressed by the pressure of said liquid when such pressure attains a predetermined value to close said clearance in an area separate from the area of contact of the sealing means with said cylinder, thereby providing a seal independently of that provided by said sealing means, and means for relieving the pressure upon said sealing means when a seal is established by the deflectable wall portion of said cylinder in the manner described.

3. A device of the character described comprising a chamber filled with a compressible liquid, a cylinder which extends into said housing and which communicates with said chamber and which has a deflectable wall portion, a piston which is movable in said cylinder to compress said liquid on its inward stroke and which has an initial working clearance in said cylinder, and sealing means carried by said piston which is operable to close said clearance locally during the initial inward movement of said piston, said deflectable wall portion being compressed by the pressure of said liquid when such pressure attains a predetermined value to close said clearance and thereby provide a seal independently of that provided by said sealing means, said cylinder having a clearance into which said sealing means moves on the continued inward stroke of said piston after said deflectable wall portion has established a seal in the manner described.

4. A device of the character described comprising a closed chamber filled with a compressible liquid, a cylinder which extends into said chamber and which communicates at its inner end with said chamber and which has an open, thin-walled, free inner end, a piston movable in said cylinder to compress said liquid on its inward stroke and having an initial working clearance in said cylinder, and resilient sealing means carried by said piston for locally closing said clearance, said thin-walled free end being deflectable by the pressure of said liquid on inward stroke of the piston to close the clearance between said piston and said cylinder in an area separate from that at which said sealing means contacts said cylinder, thereby establishing a seal independently of that provided by said sealing means.

5. A fluid spring comprising a cylinder having a deflectable wall portion, a piston reciprocable in said cylinder, a housing surrounding said cylinder and providing a chamber which is filled with a compressible liquid, said cylinder being open at its lower end and communicating with said housing whereby said piston on inward stroke in said cylinder will compress said liquid, said piston having at its lower end initial working clearance in said cylinder and having a shaft portion above its lower end of reduced diameter, and sealing means mounted in the lower end of said piston to close said clearance during initial inward movement of said piston, at least part of the wall of said cylinder being compressible in response to the pressure of the compressed liquid to reduce the clearance between said wall and the lower end of the piston to establish the seal around said piston additional to said sealing means and to prevent extrusion of the sealing means between said piston and said cylinder.

6. A fluid spring comprising a housing having a chamber formed therein filled with a compressible liquid, a cylinder mounted in said housing and having an open inner end communicating with said chamber, the wall of said cylinder being of reduced thickness for a portion of its length spaced above the inner end of said cylinder, a piston reciprocable in said cylinder, said piston normally having its upper end projecting outwardly of the outer end of said cylinder and being operable on movement inwardly of said cylinder to compress said liquid, and sealing means carried by said piston to initially seal clearance between said piston and said cylinder, the portion of said cylinder wall, which is of reduced thickness, being deflectable on compression of said liquid by inward movement of said piston to establish a seal around said piston independently of said sealing means.

7. A fluid spring comprising a housing having a chamber formed therein filled with a compressible liquid, a cylinder mounted in said housing to depend into said chamber and open at least at its inner end, said housing being closed except for said cylinder, a piston reciprocable in said cylinder, a resilient sealing member mounted in said piston adjacent the inner end of said piston, said piston having a portion outward of said sealing member which normally has clearance with reference to said cylinder, said sealing member having sealing contact with said cylinder all around the inside wall of said cylinder at least in the outer position of said piston and at least during initial inward movement of said piston, said piston upon inward movement in said cylinder compressing the liquid in said chamber, at least part of the wall of said cylinder outward of the inner limit of movement of said piston being deflectable in response to the pressure of said compressed liquid to reduce the clearance between said part of said wall and the said portion of said piston which is outward of said sealing member, said part of said wall acting as an auxiliary seal to prevent extrusion of said sealing member outwardly of said piston.

8. A fluid spring comprising a housing having a chamber formed therein filled with a compressible liquid, a cylinder mounted in said housing to depend into said chamber and open at both ends, said housing being closed except for said cylinder, a piston reciprocable in said cylinder and having a head adjacent its inner end and a shank portion outward of said head, a resilient sealing member carried by said head, said head having a portion outward of said sealing member which normally has clearance with reference to said cylinder but which is of greater diameter than said shank portion, said sealing member having sealing contact with said cylinder all around the inside wall of said cylinder at least in the outer position of said piston and at least during the initial inward movement of said piston, said piston upon inward movement in said cylinder compressing the liquid in said chamber, at least part of the wall of said cylinder outward of the inner limit of movement of said piston being deflectable in response to the pressure of said compressed liquid to reduce the clearance between said part of said wall and the said portion of said head which is outward of said sealing member, said part of said wall acting as an auxiliary seal to prevent extrusion of said sealing member outwardly of said head.

9. A liquid spring comprising a hollow housing, a cylinder projecting into said housing and spaced from the inside wall of said housing and surrounded thereby, said cylinder having at least a portion of its wall thinner than the surrounding wall of said housing, said cylinder and housing defining a chamber and said cylinder opening at its inner end into said chamber, a piston reciprocable in said cylinder, said piston having working clearance in said cylinder, sealing means carried by said piston for locally closing said clearance during inward movement of said piston in said cylinder, and a compressible liquid filling said housing and the portion of said cylinder inward of said piston, said piston upon movement inwardly in said cylinder compressing said liquid to cause said liquid to deflect the wall of said cylinder when the pressure of said liquid attains a predetermined value, thereby to reduce the clearance between the piston and the cylinder in an area separate from the area of contact of said sealing means with said cylinder, so as to prevent extrusion of said sealing means outwardly of said piston.

10. A liquid spring comprising a cylinder having a readily deflectable wall portion and a wall portion which resists deflection, a housing surrounding said cylinder and spaced therefrom and providing with said cylinder a chamber, a compressible liquid filling said chamber, a piston reciprocable in and having working clearance with reference to said cylinder, a resilient sealing member carried by said piston which is operable to close said clearance, said cylinder communicating with said chamber on the inside of said piston, said piston compressing said liquid upon movement of said piston inwardly in said cylinder, the readily deflectable wall portion of said cylinder being deflected when the pressure of said liquid attains a predetermined value to reduce said clearance in an area separate from the area of contact of said sealing member with said cylinder to prevent extrusion of said sealing member outwardly of said piston.

References Cited in the file of this patent

UNITED STATES PATENTS

| | | |
|---|---|---|
| 51,956 | Merlett | Jan. 9, 1866 |
| 1,142,825 | Lyons | June 15, 1915 |
| 2,057,893 | Gross | Oct. 20, 1936 |

FOREIGN PATENTS

| | | |
|---|---|---|
| 105,053 | Great Britain | of 1917 |